US007013849B2

(12) United States Patent
Rabhi

(10) Patent No.: US 7,013,849 B2
(45) Date of Patent: Mar. 21, 2006

(54) VARIABLE CYLINDER CAPACITY ENGINE

(76) Inventor: Vianney Rabhi, 35, Cours d'Herbouville, Lyon (FR) F-69004

( * ) Notice: Subject to any disclaimer, the term of this patent is extended or adjusted under 35 U.S.C. 154(b) by 53 days.

(21) Appl. No.: 10/484,087

(22) PCT Filed: Jul. 17, 2002

(86) PCT No.: PCT/FR02/02546

§ 371 (c)(1),
(2), (4) Date: Jan. 16, 2004

(87) PCT Pub. No.: WO03/008783

PCT Pub. Date: Jan. 30, 2003

(65) Prior Publication Data

US 2004/0168669 A1    Sep. 2, 2004

(30) Foreign Application Priority Data

Jul. 18, 2001    (FR) .................................... 01 09597

(51) Int. Cl.
F02B 75/04    (2006.01)

(52) U.S. Cl. ................................ 123/48 B; 123/78 BA

(58) Field of Classification Search .............. 123/48 B, 123/78 BA, 197.1, 197.3; 74/29, 30, 32

See application file for complete search history.

(56) References Cited

U.S. PATENT DOCUMENTS

| 5,934,243 A | * | 8/1999 | Kopystanski ............ 123/197.1 |
| 6,354,252 B1 | * | 3/2002 | Rabhi ...................... 123/197.3 |
| 6,397,722 B1 | * | 6/2002 | Eddington ................ 91/170 R |

FOREIGN PATENT DOCUMENTS

| FR | 727 994 | 6/1932 |
| FR | 1 402 509 | 6/1965 |
| FR | 2 763 096 | 11/1998 |
| FR | 2 763 097 | 11/1998 |
| GB | 221 477 | 2/1925 |

* cited by examiner

Primary Examiner—Noah P. Kamen
(74) Attorney, Agent, or Firm—Young & Thompson

(57) ABSTRACT

A mechanical transmission device for a variable cylinder capacity engine includes at least a cylinder (10) wherein moves a piston (2), which is integral in its lower portion with a transmission member (3) co-operating through a small-sized rack (37) with a roller bearing guide device (4) and through another large-sized rack (35) with a sprocket wheel (5) linked to a connecting rod (6), a control member (7) having a large-sized rack (73) co-operating with the sprocket wheel (5), elements for fixing (24, 31) the piston (2) on the transmission member (3) which provide a preload for clamping it and ensure its centring, linking elements (11, 12; 71, 72) for rigidifying the transmission (3) and control (7) members and for increasing the flexural strength of the teeth of the large-sized racks (35, 73) and elements for lightening (56) the sprocket wheel (5) which maintain its rigidity and load capacity.

30 Claims, 12 Drawing Sheets

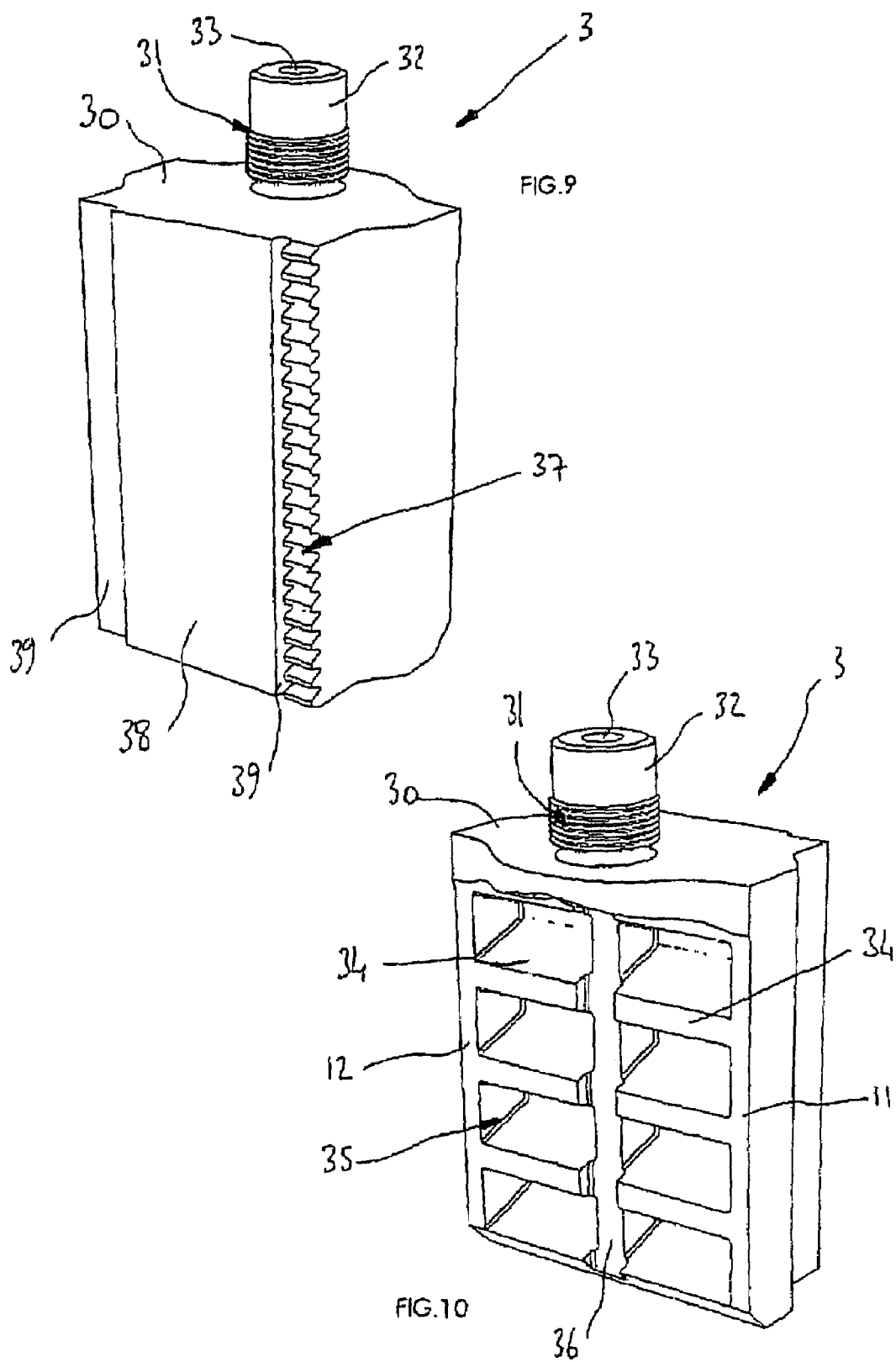

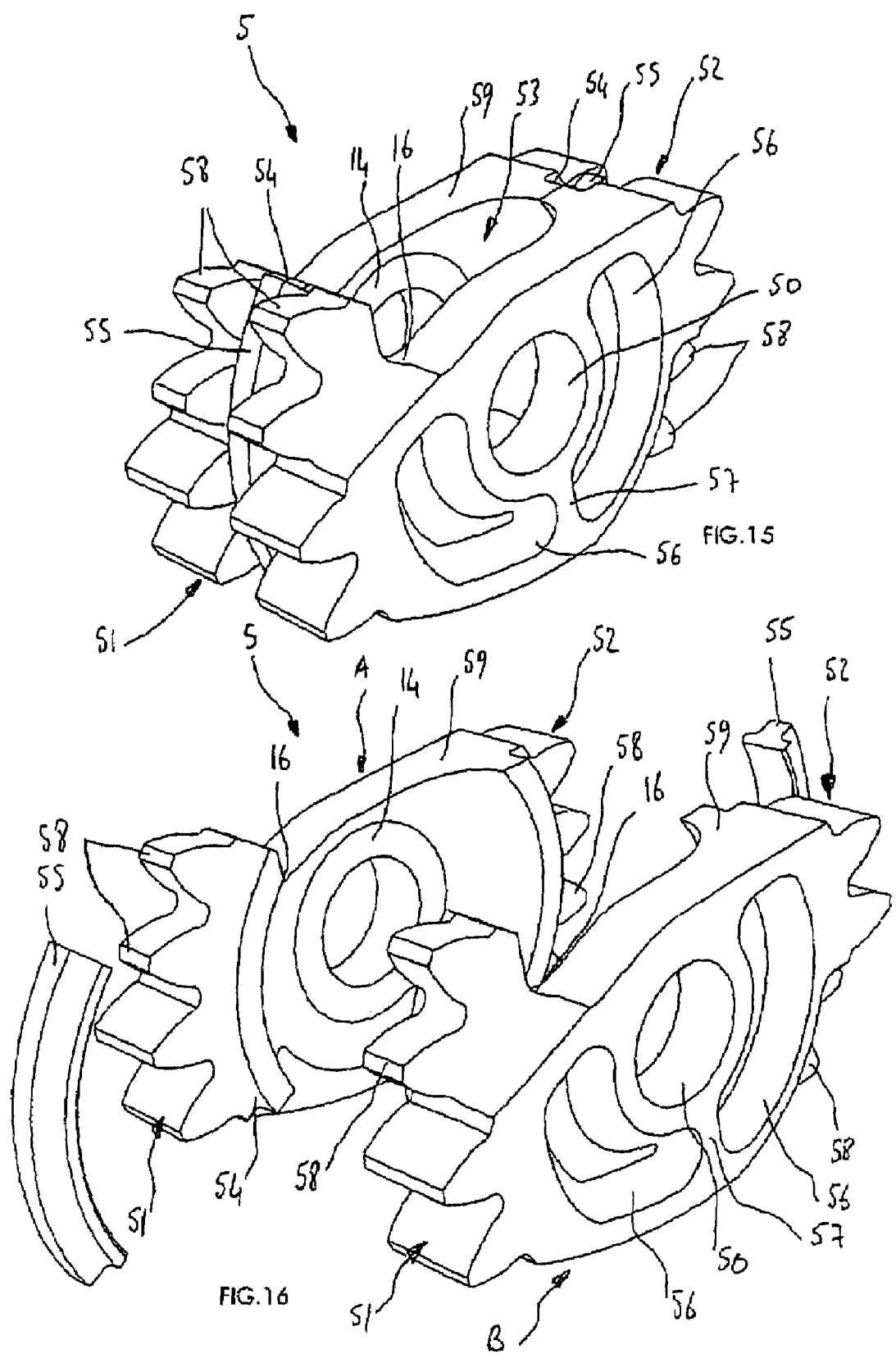

VARIABLE CYLINDER CAPACITY ENGINE

BACKGROUND OF THE INVENTION

The present invention relates to a mechanical transmission device for guiding the piston or pistons of a variable cylinder capacity engine.

The mechanical transmission device according to the present invention improves upon the transmission device described and protected in French patent application No. 98 15089 belonging to the Applicant.

Specifically, the transmission device described in patent No. 98 15089 solved problems associated with the weight, rigidity and load-bearing capability of the various components. This patent also solved problems related to risks of the piston becoming seized in the cylinder and the vertical compactness of the engine as a whole.

SUMMARY OF THE INVENTION

The mechanical transmission device according to the present invention proposes solutions for lightening the racks and the toothed wheel while at the same time preserving their rigidity. The device also improves the guidance and fixing of the piston and reduces the vertical bulk of the mechanical transmission device.

The mechanical transmission device according to the present invention addresses the risks of seizure of the piston by, on the one hand, guiding said piston in its cylinder and, on the other hand, providing guidance with respect to the engine block of the transmission member secured to the piston using a synchronized rolling guide device.

The mechanical transmission device according to the present invention is designed to reduce vertical bulk.

The mechanical transmission device according to the present invention has the advantage of making it easier to machine each component of the variable cylinder capacity engine.

The mechanical transmission device for a variable cylinder capacity engine according to the present invention comprises at least one cylinder in which a piston moves. The piston is secured at its lower part to a transmission member and collaborates with a small-sized rack with a rolling guide device and a first large-sized rack, with a toothed wheel connected to a connecting rod. The device also includes a control member comprising a second large-sized rack collaborating with the toothed wheel and fixing means for fixing the piston onto the transmission member. The fixing means preload clamps and centers the piston. The device further includes connecting means which stiffen the transmission and/or control members and increase the bending strength of the teeth of the large-sized racks. The device still further includes lightening means for lightening the toothed wheel and which preserve the rigidity of the toothed wheel. The lightening means also preserves the ability of the toothed wheel to transmit force.

The mechanical transmission device according to the present invention comprises means for guiding the piston which consist, at the cylinder of a short guide skirt secured to the piston and, at the transmission member, of a rolling guide device which comprises a single synchronized roller.

The mechanical transmission device according to the present invention comprises means for fixing the piston onto the transmission member. The means for fixing consist of a threaded bore produced in a supporting leg of the piston and of a vertical threaded rod secured to the transmission member. The vertical threaded rod collaborates with the threaded bore to fix the piston onto the transmission member in a preloaded manner.

The mechanical transmission device according to the present invention comprises a piston having a threaded bore. The threaded bore is a plain coaxial bore collaborating with a plain portion provided on the vertical rod of the transmission member so as to center the piston as the piston is fixed onto the transmission member.

The mechanical transmission device according to the present invention comprises a piston having a supporting leg. The supporting leg has, in its internal part, a threaded bore communicating with radial openings which open into the upper part of the supporting leg.

The mechanical transmission device according to the present invention comprises a piston having radial openings open between fins provided on the external periphery of the supporting leg.

The mechanical transmission device according to the present invention comprises a piston having, between the guide skirt and a piston ring groove, ducts which open between the fins of the supporting leg.

The mechanical transmission device according to the present invention comprises connecting means connecting the teeth of the large-sized rack of the transmission member. The connecting means consist of lateral cheeks stiffening the transmission member and increasing the bending strength of the teeth of the large-sized rack.

The mechanical transmission device according to the present invention comprises a transmission member having lateral cheeks that can be used as runway tracks collaborating with runway tracks positioned laterally on the toothed wheel.

The mechanical transmission device according to the present invention comprises connecting means connecting the teeth of the large-sized rack of the control member. The connecting means consist of lateral cheeks stiffening the control member and increasing the bending strength of the teeth of the large-sized rack.

The mechanical transmission device according to the present invention comprises a control member having lateral cheeks that can be used as runway tracks collaborating with runway tracks positioned laterally on the toothed wheel.

The mechanical transmission device according to the present invention comprises transmission and control members in which the large-sized racks comprise lateral cheeks. The lateral cheeks are formed by machining and/or forging the bodies that make up said transmission and control members.

The mechanical transmission device according to the present invention comprises transmission and control members in which the large-sized racks comprise lateral cheeks which are added onto and fixed to bodies that make up said transmission and control members.

The mechanical transmission device according to the present invention comprises a toothed wheel having a cutout on its upper profile so as to reduce the vertical bulk of the engine.

The mechanical transmission device according to the present invention comprises a toothed wheel which is made up of two toothed half-wheels joined together.

The mechanical transmission device according to the present invention comprises a toothed wheel which is made up of two toothed half-wheels joined together exhibiting a cutout on their upper profile so as to reduce the vertical bulk of the engine.

The mechanical transmission device according to the present invention comprises lightening means for lightening the toothed wheel, which consist of at least one cavity.

The mechanical transmission device according to the present invention comprises a toothed wheel and large-sized racks belonging to the transmission and control members, the teeth of which have different widths.

The mechanical transmission device according to the present invention comprises a toothed wheel and large-sized racks belonging to the transmission and control members, the teeth of which are of different dimensions.

The mechanical transmission device according to the present invention comprises a toothed wheel and large-sized racks belonging to the transmission and control members, the teeth of which have different profiles.

The mechanical transmission device according to the present invention comprises a toothed wheel the teeth of which exhibit impressions on their lateral faces which determine the stiffness of the edge of these teeth.

The mechanical transmission device according to the present invention comprises a toothed wheel. A central cavity of the toothed wheel has internal faces that act as guide surfaces for the lateral guidance of the small end of the connecting rod.

The mechanical transmission device according to the present invention wherein each toothed half-wheel has internal faces that act as a guide surface for the lateral guidance of the small end of the connecting rod.

The mechanical transmission device according to the present invention comprises a toothed wheel having a pivot axis. The pivot axis is situated in a bore of the toothed wheel and is offset from the center of the pitch circle of the toothed wheel so as to obtain variations in the kinematics of the piston.

The mechanical transmission device according to the present invention wherein the threaded rod of the transmission member has at its middle, a hole which opens, on the one hand, above a runway track of the transmission member and, on the other hand, into the threaded bore formed in the supporting leg of the piston.

The mechanical transmission device according to the present invention comprises transmission and control members having runway tracks which are produced by machining and/or forging the bodies of said transmission and control members.

The mechanical transmission device according to the present invention comprises a transmission member which is provided with lightening means.

The mechanical transmission device according to the present invention comprises a rolling guide device which is made up of a synchronized roller and of a small-sized rack device secured to the engine block. The rolling guide device collaborates with the small-sized rack of the transmission member so as to guide the transmission member on the engine block and to synchronize the vertical movement of said roller with respect to the piston.

The mechanical transmission device according to the present invention comprises a rolling guide device having a roller that consists of a cylindrical body comprising, at each end, pinions and an axial guide groove provided between the pinions.

The mechanical transmission device according to the present invention comprises a rack device secured to the engine block. The rack device has a central body forming a runway track. The runway track has, at its middle, a vertical rib which collaborates with the guide groove of the roller so as to provide lateral guidance therefor. The rack device also has racks which are fixed onto the vertical edges of said body to collaborate with the pinions of the roller so as to synchronize the vertical movement of said roller with that of the piston.

BRIEF DESCRIPTION OF THE DRAWINGS

The description which will follow with reference to the appended drawings, given by way of nonlimiting examples, will allow for a better understanding of the invention, of the features it offers and of the advantages it is able to afford:

FIGS. 9 to 13 are views illustrating in detail the transmission member secured to the piston of the mechanical transmission device according to the present invention.

FIGS. 15 to 18 are views depicting a toothed wheel of the mechanical transmission device according to the present invention.

DETAILED DESCRIPTION OF THE PREFERRED EMBODIMENTS

Figure 1:
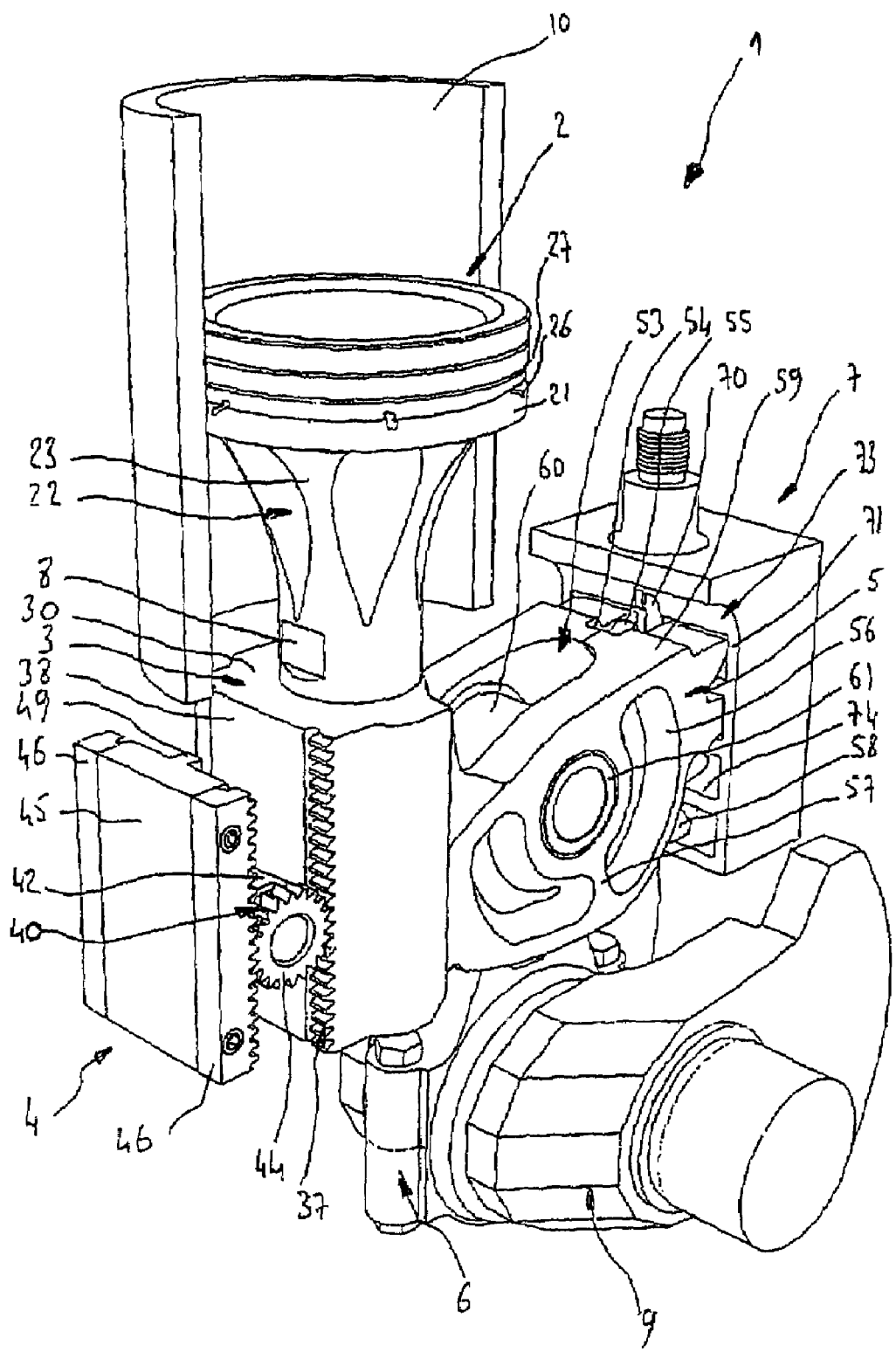
FIG. 1 is a perspective view illustrating all of the components that make up the mechanical transmission device according to the present invention.
Figure 2:
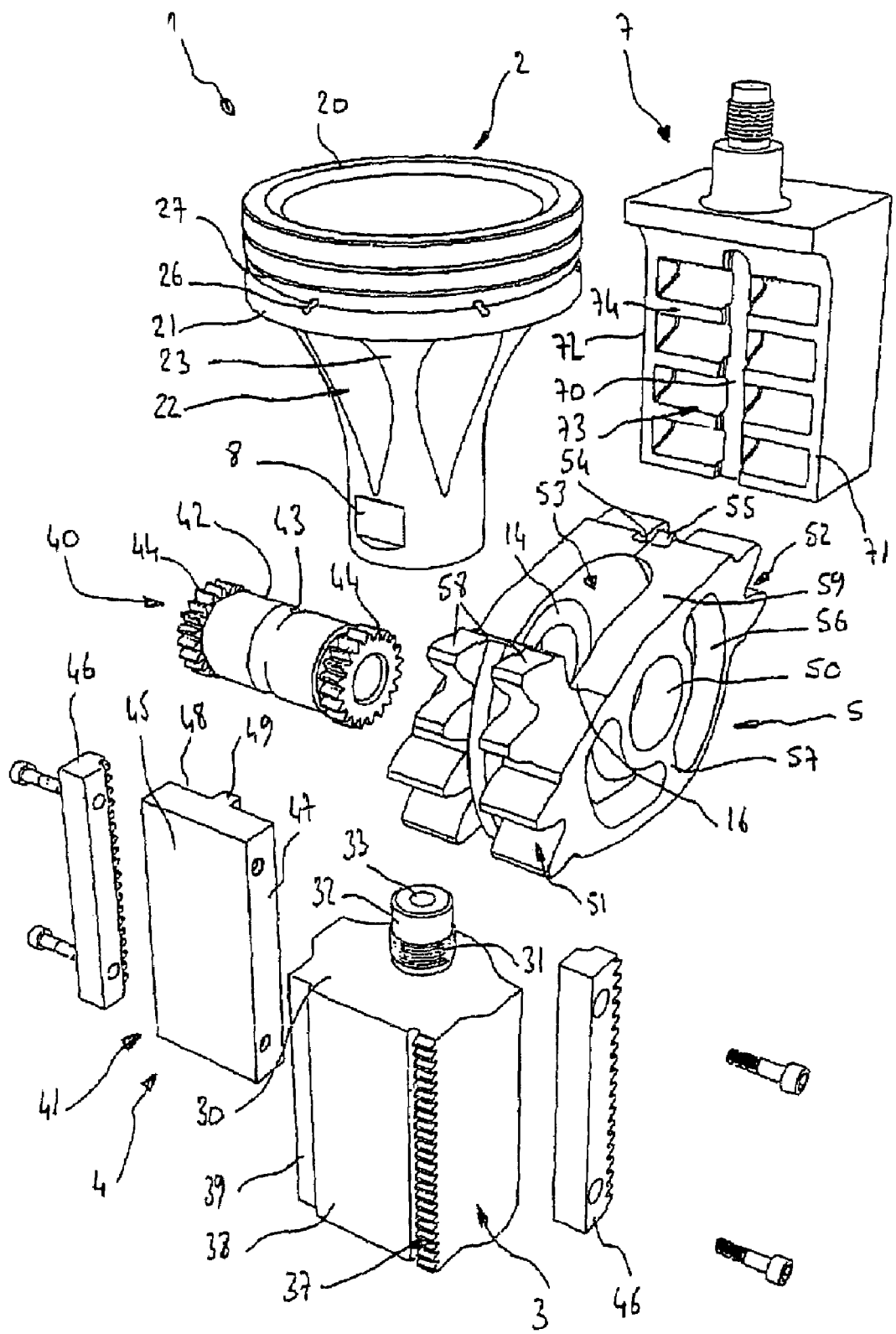
FIG. 2 is an exploded perspective view depicting the mechanical transmission device according to the present invention.
Figure 3:
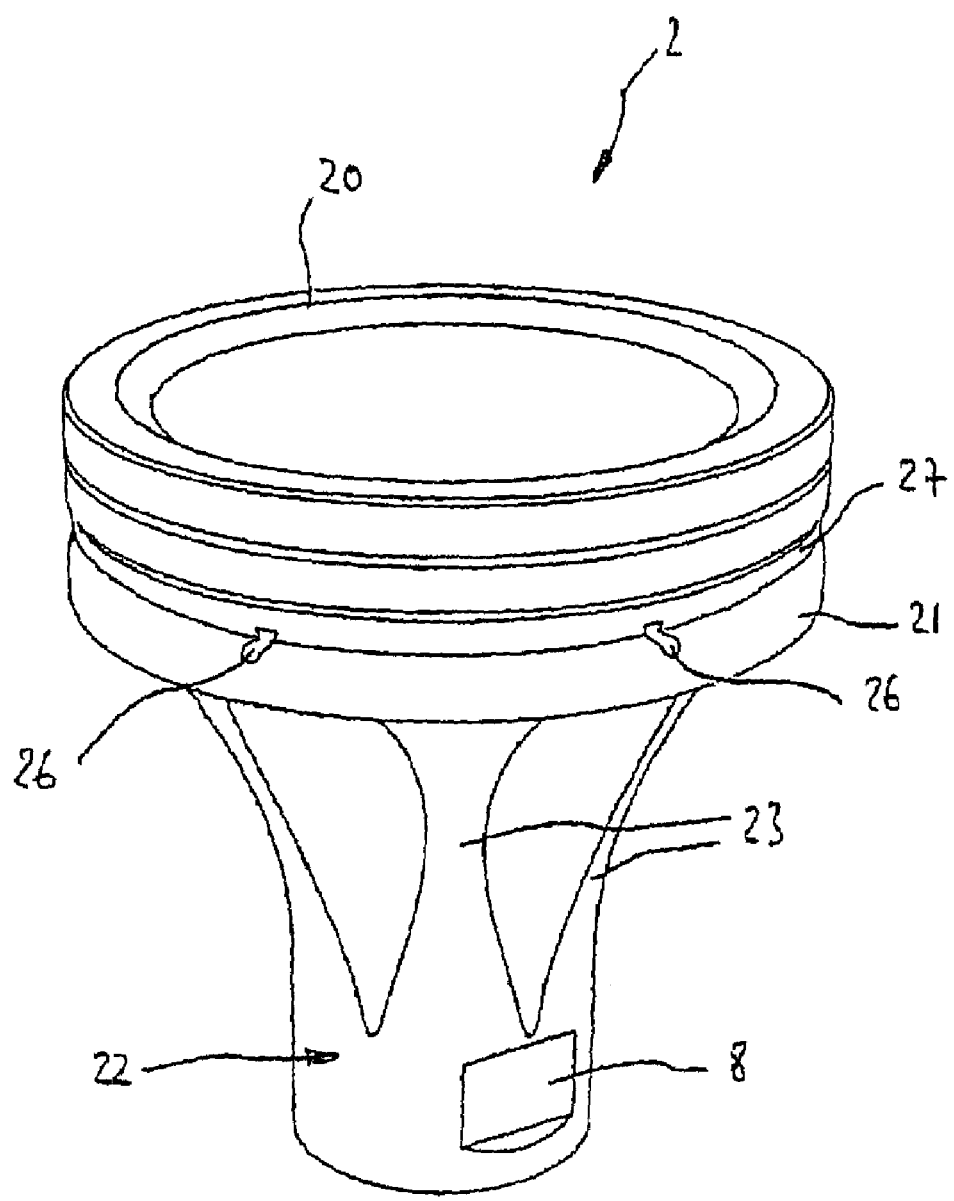
FIGS. 3 to 8 are views depicting in detail the piston of the mechanical transmission device according to the present invention.
Figure 4:
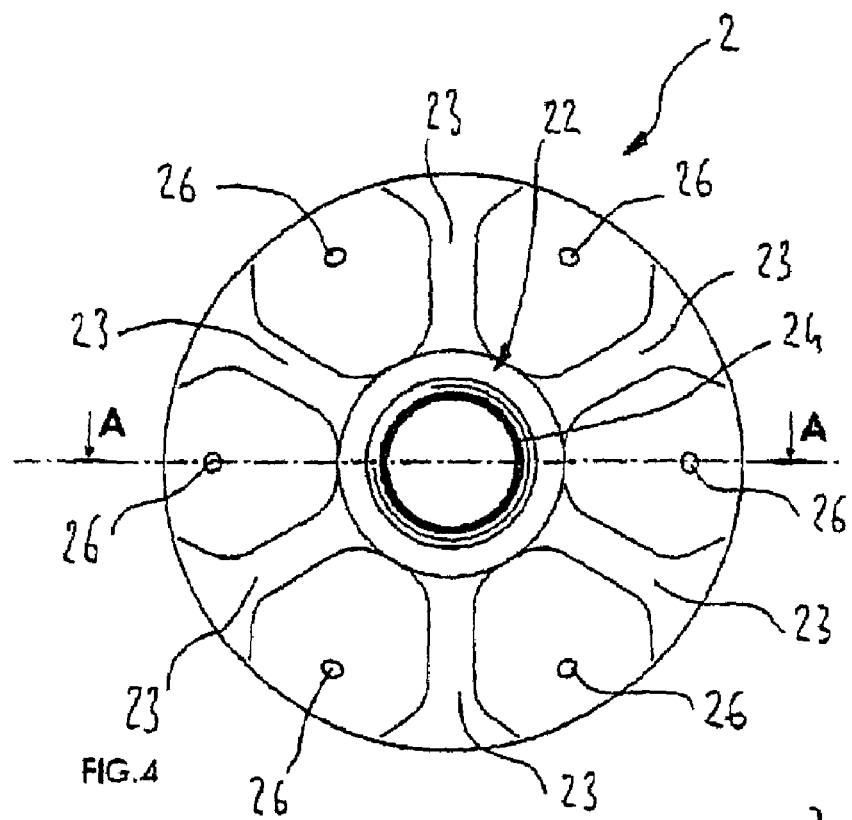
Figure 5:
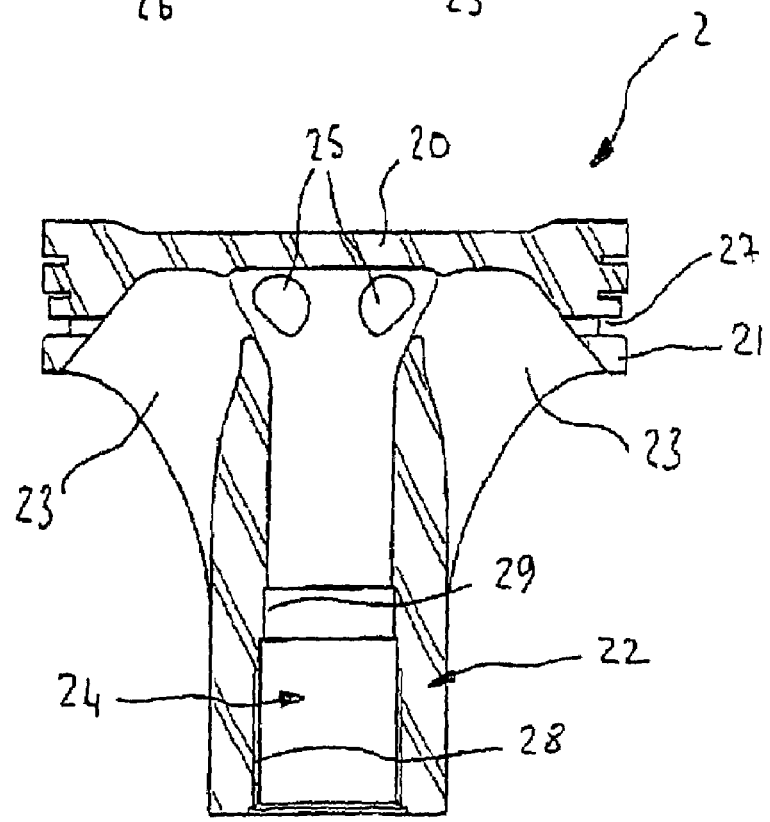
Figure 6:
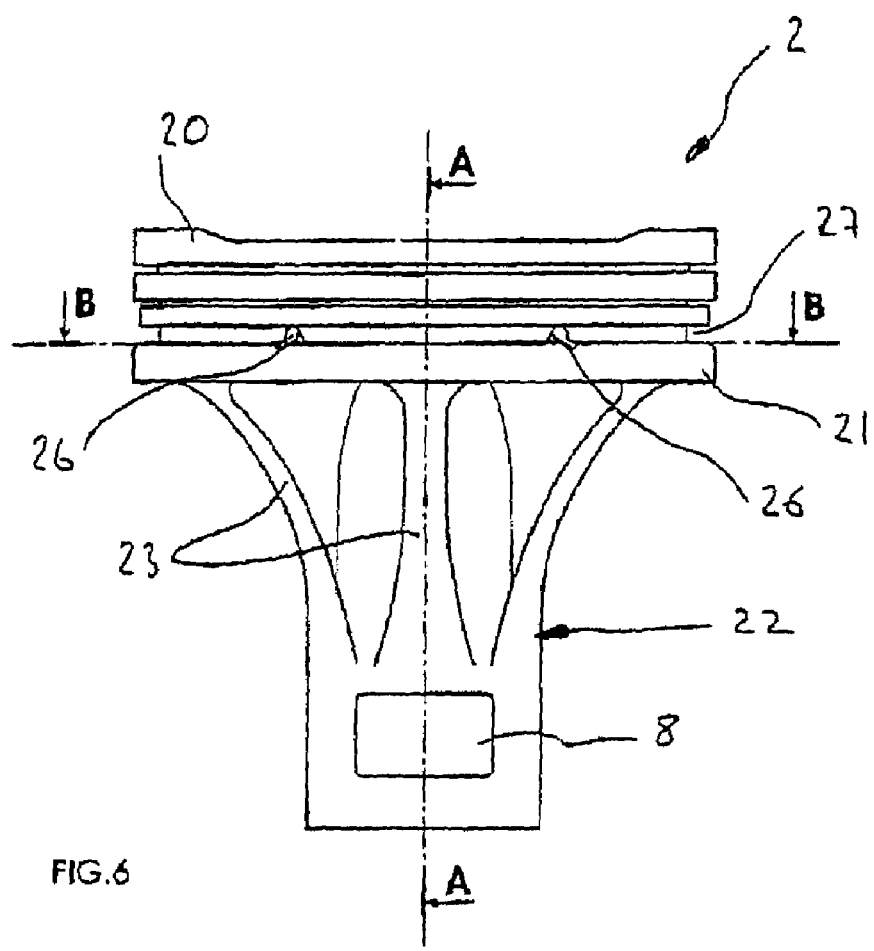
Figure 7:
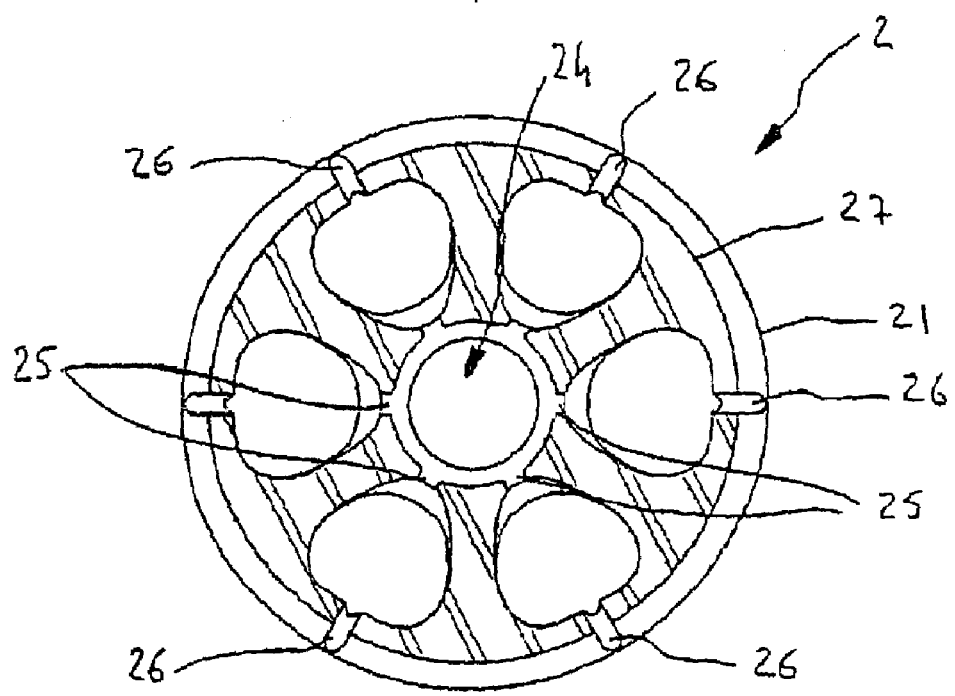
Figure 8:
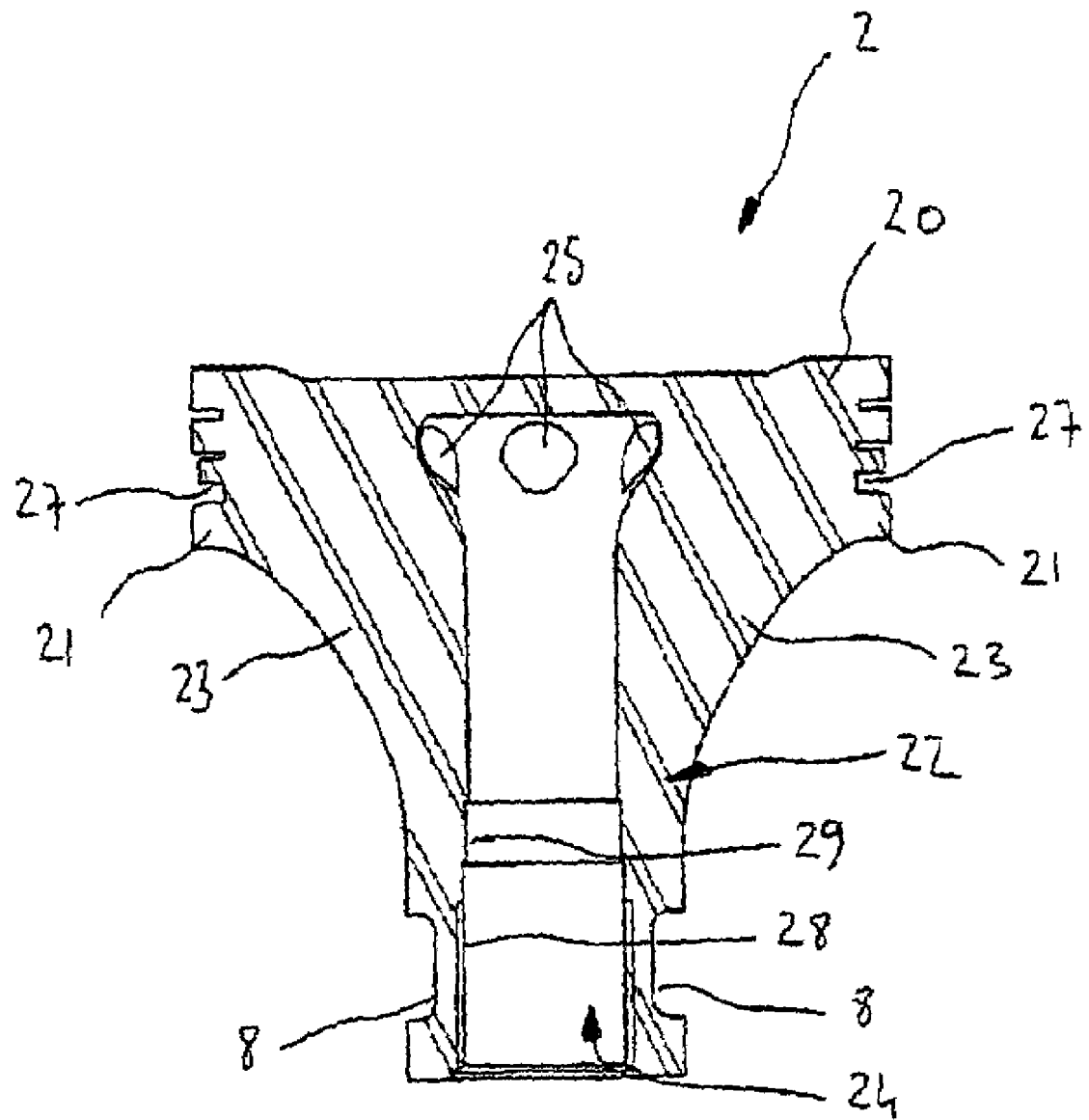
Figure 11:
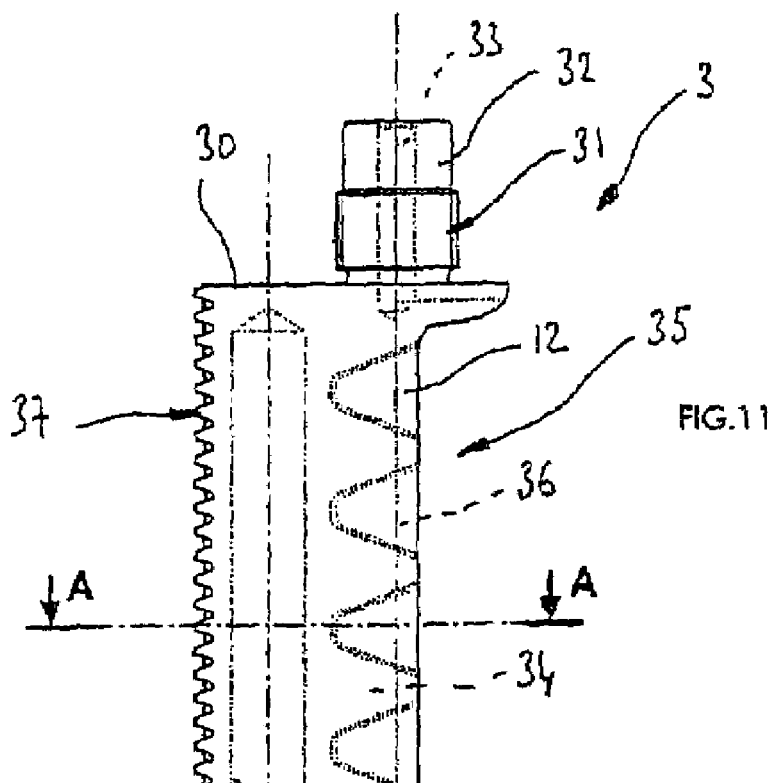
Figure 12:
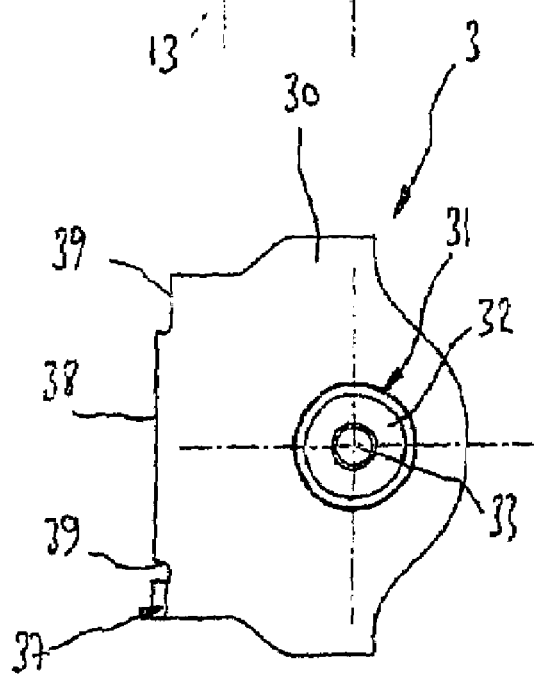
Figure 13:
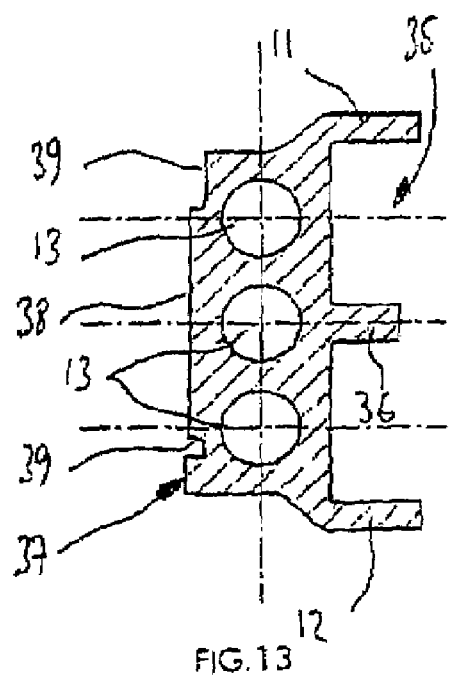

FIGS. 1 and 2 depict a mechanical transmission device 1 for a variable cylinder capacity engine comprising a piston 2 which is guided and driven in translational movement in a cylinder 10 of the engine block.

The piston 2 is secured at its lower part to a transmission member 3 which collaborates with a rolling guide device 4 and with a toothed wheel 5.

The toothed wheel 5 transmits the motion between a crankshaft 9 and the transmission member 3 secured to the piston 2 via a connecting rod 6 on which the toothed wheel 5 is mounted, by means of a connecting pin 61 which allows the toothed wheel 5 to pivot.

The toothed wheel 5 collaborates at the opposite end of the transmission member 3 with another member known as the control member 7 which is mounted in a recess or on a guide which are formed in the engine block.

The position of the control member 7 with respect to the engine block is afforded by a positioning device, not depicted, but described in a French patent application No 98 04601 belonging to the Applicant.

FIGS. 3 to 8 show the piston 2 which is made up of a thick disk 20 provided with the grooves able respectively to receive the firing ring, compression ring and oil-control ring all known per se.

The disk 20 comprises, in its lower part, a short guide skirt 21 which guides the piston 2 in the cylinder 10.

The underside of the thick disk 20 is secured to a supporting leg 22 bearing fins 23 on an external periphery of the supporting leg.

The supporting leg 22 comprises, in its internal part, a bore 24 which opens into radial openings 25 formed in the upper part of said supporting leg.

The radial openings 25 open between the fins 23 of the supporting leg 22.

Between the guide skirt 21 and a piston ring groove 27 the piston 2 comprises ducts 26 which open between the fins 23 of the supporting leg 22.

The bore 24 exhibits, at the base of the supporting leg 22, a threaded part 28 and a plain coaxial centering bore 29.

The supporting leg 22 comprises, on its external periphery and underneath the fins 23, at least one purchase for a tool to turn the piston 2 when the piston is being fixed onto the transmission member 3. The at least one purchase, for example, takes the form of two diametrically opposed impressions 8.

The piston 2 can be fixed in its unfinished state onto the control member 3 and then machined to form all of the surfaces, particularly those which have a functional surface finish.

FIGS. 9 to 13 depict the transmission member 3 which in one embodiment is a 1-piece body 30. The body 30 has at an upper part, a threaded rod 31 extending vertically and collaborating with the threaded part 28 of the bore 24 when the piston 2 is attached.

The threaded rod 31 comprises a plain portion 32 which collaborates with the plain coaxial bore 29 of the threaded bore 24 to center the piston 2 on the transmission member 3.

The transmission member 3 comprises a large-sized rack 35 which is made up of parallel teeth 34 and a runway track 36 which is set back from the crests of said teeth and lies near the pitch circle of the large-sized rack 35.

The parallel teeth 34 of the large-sized rack 35 are vertically separated by the runway track 36.

The transmission member 3 comprises connecting means connecting the teeth 34 of the large-sized rack 35. The connecting means may be lateral cheeks 11 and 12 that stiffen the transmission member 3 and increasing the bending strength of the teeth 34 of the large-sized rack 35.

The lateral cheeks 11, 12 and the runway track 36 are produced by machining and/or forging the body 30 of the transmission member 3.

The lateral cheeks 11 and 12 may also be added onto and fixed to the body 30 of the transmission member 3.

Alternatively, the lateral cheeks 11 and 12 may be used as a runway track collaborating with runway tracks positioned laterally on the toothed wheel 5. In this case, the runway track 36 may be omitted.

The threaded rod 31 comprises, at its middle, a hole 33 which opens into the bore 24 of the piston 2 and above the runway track 36 separating the teeth 34 of the large-sized rack 35.

The hole 33, when the engine is running, plays a part in lubricating the runway track 36 because the hole communicates directly with the internal bore 24 of the piston 2 which, via the radial openings 25, receives oil from the lower part of the engine.

What really happens is that the engine lubricating oil is injected by nozzles, not depicted, or splashed onto the underside of the piston 2.

Thus, the oil circulates within the bore 24 of the piston 2 and between the fins 23 via the radial openings 25.

The transmission member 3 comprises, at the opposite end to the large-sized rack 35 and on one of the vertical edges 39 of the transmission member, another, small-sized rack 37 and a runway track 38 which collaborate with the rolling guide device 4 secured to the engine block.

The small-sized rack 37 may be machined directly into the body 30 or added onto and fixed to the body 30. The rack 37 may be equally provided on each of the vertical edges 39 of the body 30, depending on the construction of the rolling guide device 4.

The body 30 of the transmission member 3 is provided with a lightening means which, for example, consist of a series of blind lightening holes 13.

Figure 14:
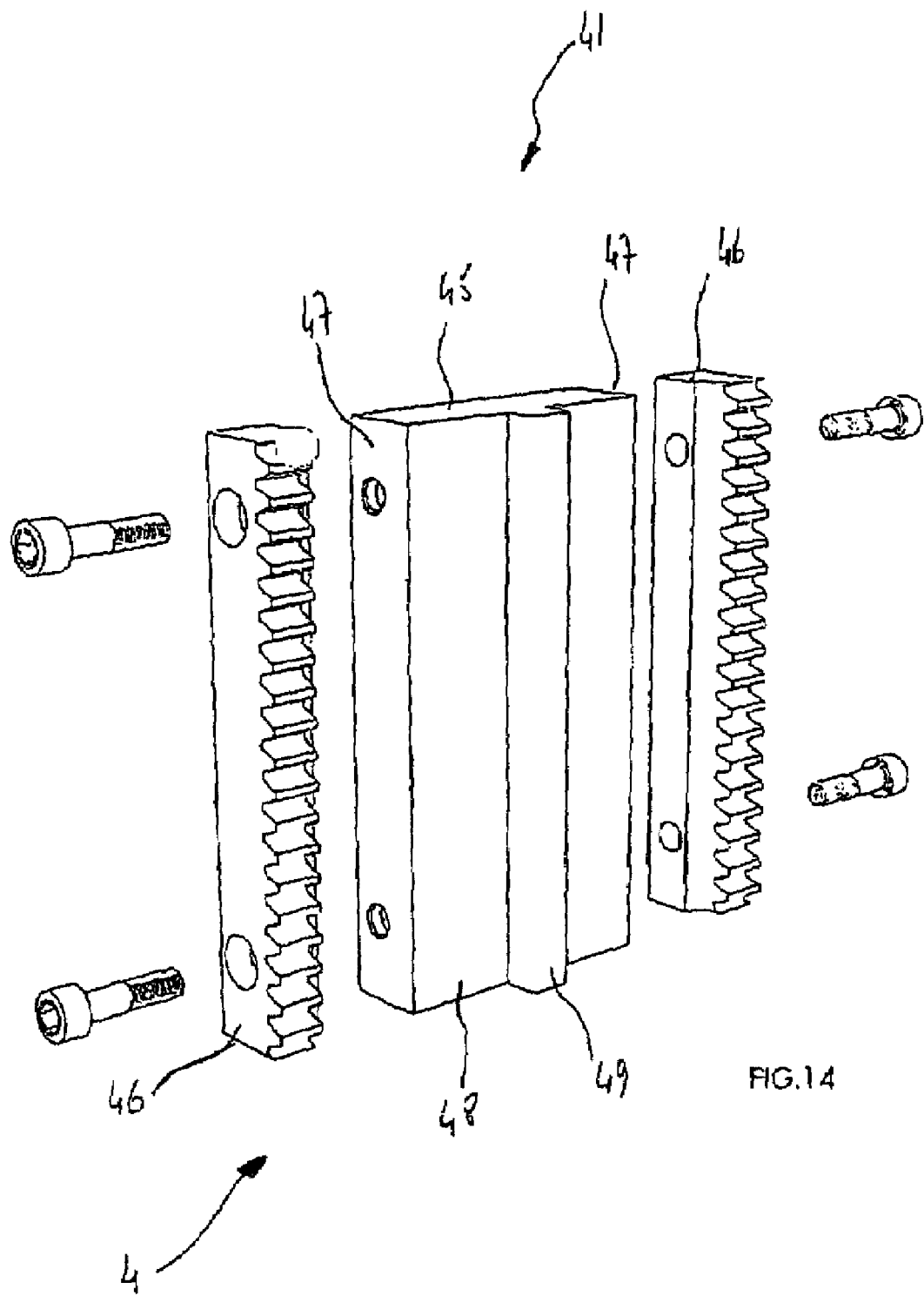
FIG. 14 is a perspective view showing in detail part of the rolling guide device according to the present invention.

FIGS. 2 and 14 illustrate the rolling guide device 4 which consists of a synchronized roller 40 and of a rack device 41 secured to the engine block. The rolling guide device 4 guides the transmission member 3 on the engine block and synchronizes the vertical movement of said roller 40 with respect to the piston 2.

The roller 40 is made up of a cylindrical body 42 comprising pinions 44 at each end.

The cylindrical body 42 at its middle and between the pinions 44 has a guide groove 43.

The rack device 41 is made up of a central body 45 and of racks 46 which are fixed to the vertical edges 47 of said body 45. The body 45 comprises a runway track 48 and a vertical rib 49.

The first pinion 44 of the roller 40 collaborates with the small-sized rack 37 of the transmission member 3 and with one of the racks 46 of the rack device 41.

The second pinion 44 of the roller 40 collaborates only with the other rack 46 of the device 41, while the vertical rib 49 of the body 45 collaborates with the guide groove 43 of the body 42 to provide lateral guidance for the roller 40.

The body 42 of the roller 40 provides guidance for the transmission member 3 by rolling along the runway track 38 of said member and by rolling along the track 48 of the body 45 of the rack device 41.

FIGS. 1, 15 and 16 depict the toothed wheel 5 of the mechanical transmission device 1 according to the present invention.

The toothed wheel 5 is made up of two toothed half-wheels A and B which are joined together, for example, by welding, brazing, electron welding, laser welding or electromagnetic induction brazing.

The toothed wheel 5, which may or may not be made up of two toothed half-wheels A and B, has a cutout 16 on its upper profile 59 to reduce the vertical bulk of the transmission device according to the invention as a whole.

The toothed wheel 5 also has a central cavity 53 into which there opens a bore 50 for the placement of the small end 60 of the connecting rod 6 via the connecting pin 61.

The internal faces of the central cavity 53 of the toothed wheel 5 have guide surfaces 14 for laterally guiding the small end 60 of the connecting rod 6.

Also, the internal faces of each toothed half-wheel A and B of the toothed wheel 5 exhibit a guide surface 14 for the lateral guidance of the small end 60 of the connecting rod 6.

The toothed wheel 5 comprises a first set of teeth 51 collaborating with the teeth 34 of the large-sized rack 35 of the transmission member 3 secured to the piston 2 and a second set of teeth 52 collaborating with the large-sized rack 73 of the control member 7.

Each set of teeth 51, 52 comprises at its middle a groove 54 coaxial with the pitch circle of the toothed wheel 5.

Within each groove 54 is fixed a runway strip 55 exhibiting a curved profile similar to that of said groove. Each runway strip 55 is fixed, for example by laser welding or electron welding, into the corresponding curved groove 54.

The toothed wheel 5 has cavities 56 which may or may not be blind in the central cavity 53. The cavities 56 are designed to lighten the toothed wheel 5 while at the same time preserving its rigidity and its load-bearing capacity.

The cavities 56 may be separated from one another by thin webs 57 so as to stiffen the structure of the toothed wheel 5.

The set of teeth 51 comprises in its upper part teeth 58 of a width that is reduced by comparison with the other teeth of the toothed wheel 5.

The upper cutout 16 of the toothed wheel 5 and the teeth 58 make it possible to reduce the vertical bulk of the mechanical transmission device 1.

This is because, with this configuration, the teeth 58 penetrate further inside the cylinder 10 when the piston 2 is near the top of its stroke.

Also, the set of teeth 52 comprises, in its lower part, teeth 58 of a width which is reduced by comparison with the other teeth so as to bring the center of gravity of the toothed wheel 5 closer to its pivot axis.

The pivot axis of the toothed wheel 5, which axis is situated in the bore 50, may be offset from the center of the pitch circle of said toothed wheel. The offsetting of the pivot axis of the toothed wheel 5 makes it possible to obtain variations in the kinematics of the piston 2.

Figure 17:
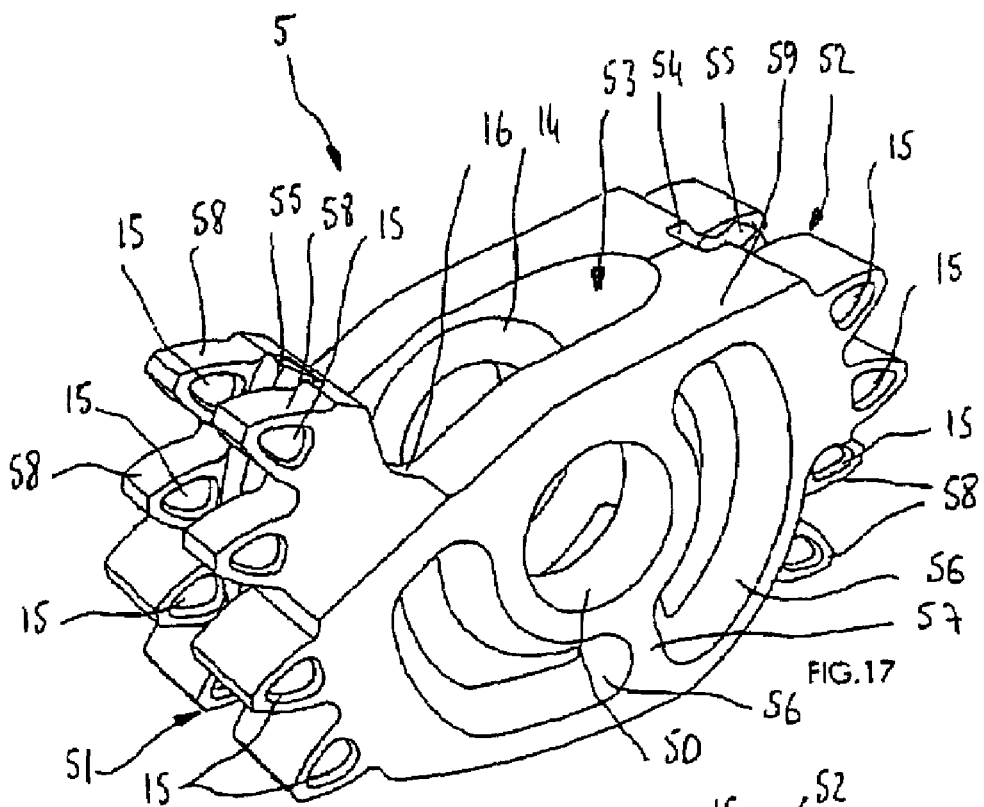
Figure 18:
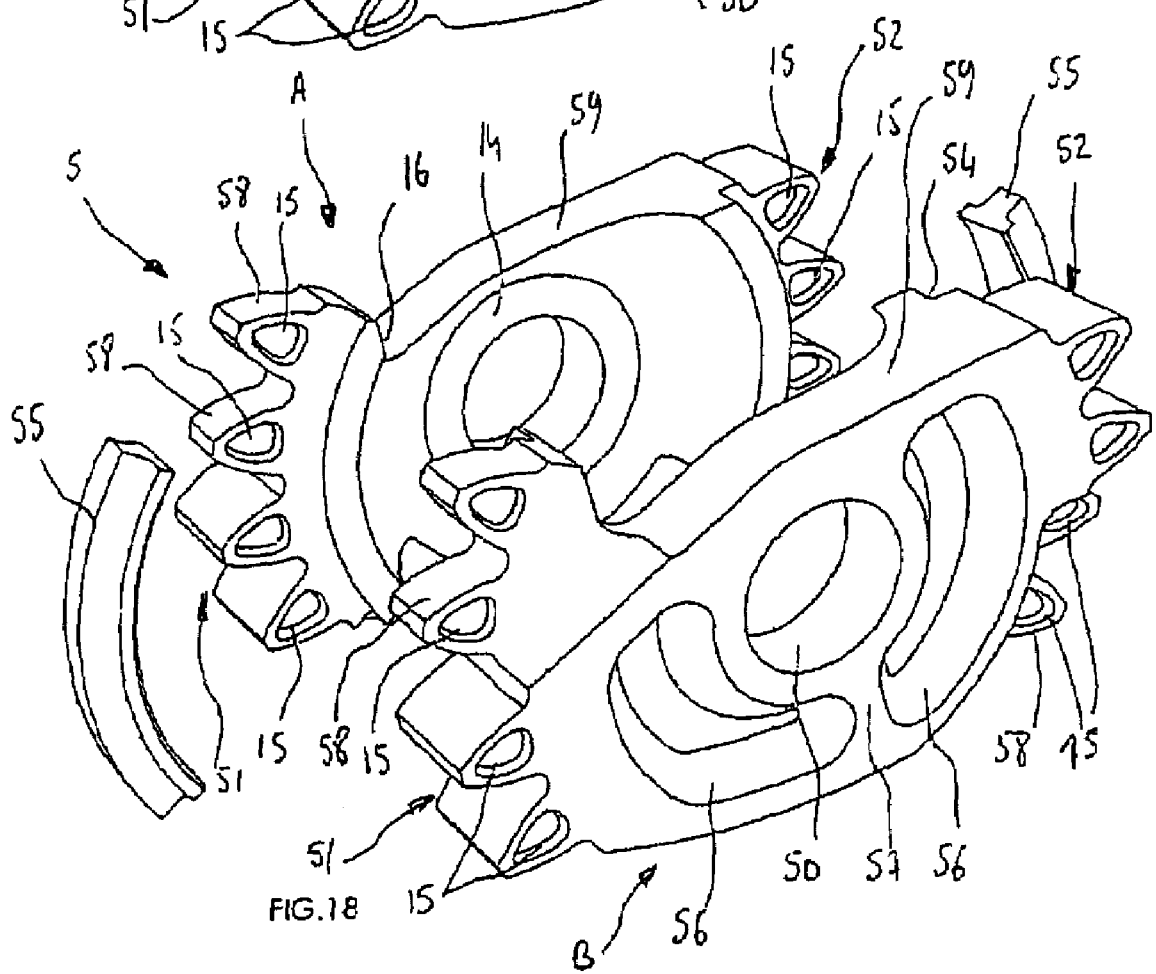

FIGS. 17 and 18 depict the toothed wheel 5 provided with means for mastering the edge effect of the sets of teeth.

It is known that in order to avoid excessive stress on the edges of the sets of teeth the teeth may be corrected in a way currently termed "curving".

This operation which is expensive in industry may be replaced by control over the stiffness of the teeth of the toothed wheel 5 across their width, and particularly on the edges of said teeth.

This control, which is the subject of the present invention, will be obtained by making at least one impression 15 on each side of the teeth of the toothed wheel 5.

These impressions 15 have shapes such that they reduce the stiffness of the edges of the teeth of the toothed wheel 5 so as to limit the stresses due to the edge effect.

These impressions 15 may be produced when the toothed wheel 5 is being forged.

Figure 19:
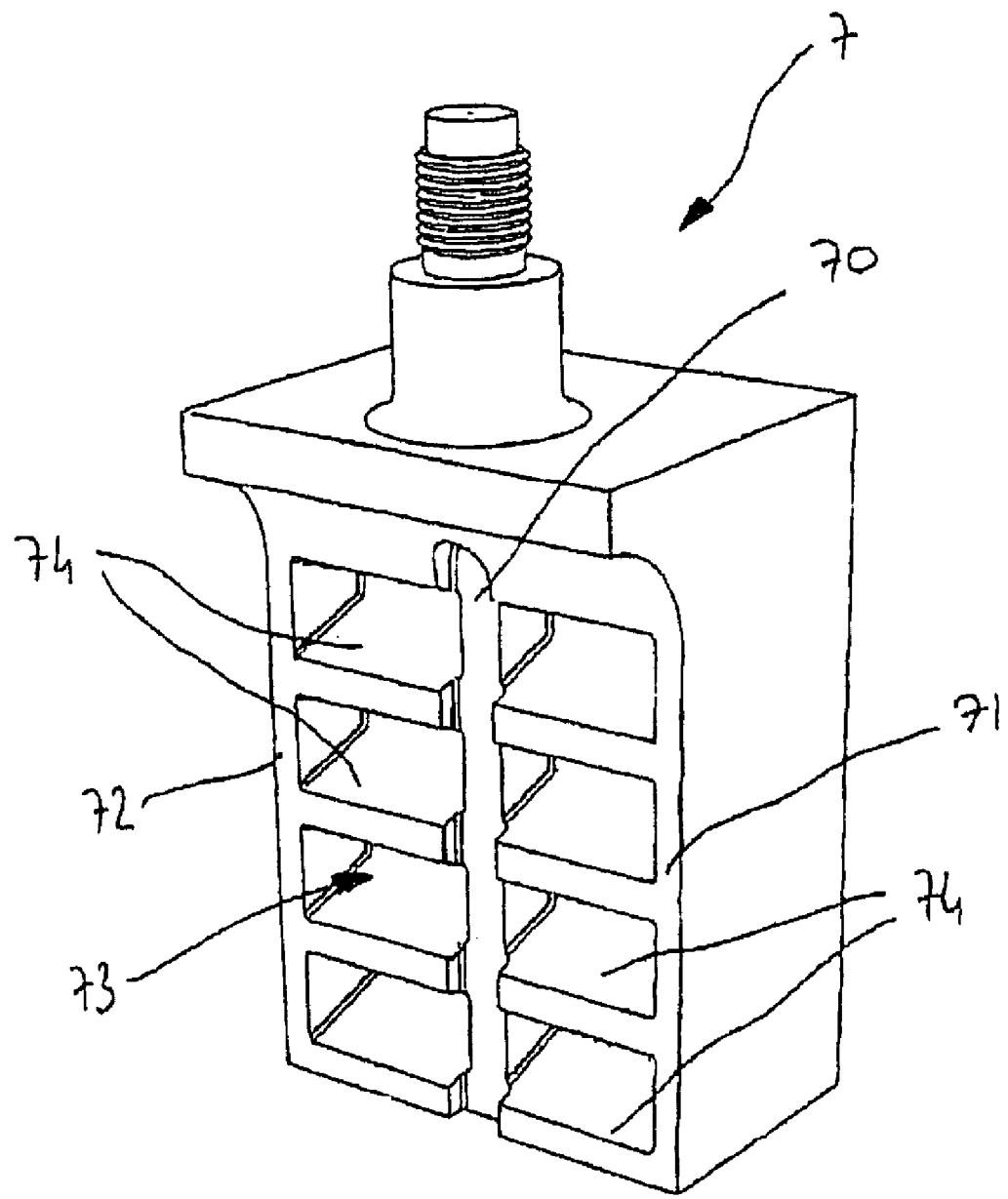
FIG. 19 is a perspective view showing in detail the control member collaborating with a toothed wheel of the mechanical transmission device according to the present invention.

FIG. 19 shows the control member 7 which comprises a large-sized rack 73 and a vertical runway track 70 with which the runway strip 55 provided at the middle of the set of teeth 52 of the toothed wheel 5 collaborates.

The parallel teeth 74 of the large-sized rack 73 are vertically separated by the runway track 70.

The control member 7 comprises connecting means connecting the teeth 74 of the large-sized rack 73 which consist of lateral cheeks 71 and 72 stiffening the control member 7 and increasing the bending strength of the teeth of the large-sized rack 73.

The lateral cheeks 71, 72 and the runway track 70 are produced by machining and/or forging the body of which the control member 7 is made.

Provision may be made for the lateral cheeks 71 and 72 to be added onto and fixed to the body of the control member 7.

By way of an alternative, the lateral cheeks 71 and 72 may be used as a runway track collaborating with runway tracks positioned laterally on the toothed wheel 5. In this case, the runway track 70 may be omitted.

It must also be understood that the foregoing description has been given merely by way of example and that it does not in any way restrict the scope of the invention which would not be exceeded if embodiment details described were replaced by any other equivalent.

The invention claimed is:

1. A mechanical transmission device for a variable cylinder capacity engine comprising:

at least one cylinder;

a transmission member;

a piston movable within said cylinder, said piston being secured at a lower part to said transmission member, said transmission member having a first small-sized rack that collaborates with a rolling guide device and a first large-sized rack that collaborates with a toothed wheel, said toothed wheel being connected to a connecting rod;

a control member comprising a second large-sized rack collaborating with the toothed wheel;

fixing means for fixing the piston onto the transmission member, said fixing means provide clamping preload and center the piston;

connecting means that stiffen at least one of the transmission and the control member and that increase the bending strength of the teeth of the first and second large-sized racks; and lightening means for lightening the toothed wheel while preserving the rigidity and the load-bearing capacity of the toothed wheel.

2. The mechanical transmission device as claimed in claim 1, further comprising means for guiding the piston, said means for guiding comprise, at the cylinder, a short guide skirt secured to the piston and, at the transmission member, said rolling guide device, said rolling guide device comprising a single roller.

3. The mechanical transmission device as claimed in claim 2, wherein the piston comprises ducts, between the guide skirt and a piston ring groove, said ducts open between fins on an external periphery of the supporting leg.

4. The mechanical transmission device as claimed in claim 1, wherein the means for fixing the piston onto the transmission member comprises a threaded bore produced in a supporting leg of the piston and a vertical threaded rod secured to the transmission member, which collaborates with the threaded bore to clamp the piston onto the transmission member.

5. The mechanical transmission device as claimed in claim 4, wherein the threaded bore comprises a plain coaxial bore collaborating with a plain portion provided on the vertical rod of the transmission member so as to center the piston as the piston is fixed onto the transmission member.

6. The mechanical transmission device as claimed in claim 4, wherein the threaded bore is in an internal part of said supporting leg and communicates with radial openings which open into an upper part of said supporting leg.

7. The mechanical transmission device as claimed in claim 6, wherein the radial openings in the piston open between fins provided on an external periphery of the supporting leg.

8. The mechanical transmission device as claimed in claim 6, wherein internal faces of each toothed half-wheel has a guide surface for laterally guiding a small end of the connecting rod.

9. The mechanical transmission device as claimed in claim 1, wherein the connecting means connect the teeth of the first large-sized rack of the transmission member, said connecting means comprise lateral cheeks stiffening the transmission member and increasing the bending strength of the teeth of the first large-sized rack.

10. The mechanical transmission device as claimed in claim 9, wherein the lateral cheeks can be used as runway tracks collaborating with runway tracks positioned laterally on the toothed wheel.

11. The mechanical transmission device as claimed in claim 10, wherein the lateral cheeks can be used as runway tracks collaborating with runway tracks positioned laterally on the toothed wheel.

12. The mechanical transmission device as claimed in claim 9, wherein the first and second large-sized racks comprise lateral cheeks which are produced by machining and/or forging the bodies that make up said transmission and control members.

13. The mechanical transmission device as claimed in claim 9, wherein the large-sized racks comprise lateral cheeks which are added onto and fixed to bodies that make up said transmission and control members.

14. The mechanical transmission device as claimed in claim 1, wherein the connecting means connect the teeth of the second large-sized rack of the control member, said connecting means comprise lateral cheeks stiffening the control member and increasing the bending strength of the teeth of the second large-sized rack.

15. The mechanical transmission device as claimed in claim 1, wherein the toothed wheel has a cutout on an upper profile so as to reduce the vertical bulk of the engine.

16. The mechanical transmission device as claimed in claim 15, wherein the toothed wheel comprises a central cavity having internal faces with guide surfaces for laterally guiding a small end of the connecting rod.

17. The mechanical transmission device as claimed in claim 15, wherein the toothed wheel has a pivot axis situated in a bore which is offset from the center of the pitch circle of said toothed wheel so as to obtain variations in the kinematics of the piston.

18. The mechanical transmission device as claimed in claim 1, wherein the toothed wheel is made up of two toothed half-wheels joined together.

19. The mechanical transmission device as claimed in claim 18, wherein the two toothed half-wheels each have a cutout on their upper profile so as to reduce the vertical bulk of the engine.

20. The mechanical transmission device as claimed in claim 1, wherein the lightening means for lightening the toothed wheel comprises at least one cavity.

21. The mechanical transmission device as claimed in claim 1, wherein teeth of the first and second large-sized racks have different widths.

22. The mechanical transmission device as claimed in claim 1, wherein teeth of the first and second large-sized racks are of different dimensions.

23. The mechanical transmission device as claimed in claim 1, wherein teeth of the first and second large-sized racks have different profiles.

24. The mechanical transmission device as claimed in claim 1, wherein teeth of the toothed wheel have impressions on their lateral faces which determine the stiffness of the edge of said teeth.

25. The mechanical transmission device as claimed in claim 1, wherein the transmission member has a threaded rod that has at its middle, a hole which opens above a runway track of the transmission member and into a threaded bore formed in a supporting leg of the piston.

26. The mechanical transmission device as claimed in claim 1, wherein the transmission and the control members comprise runway tracks which are produced by machining the bodies that make up said transmission and control members.

27. The mechanical transmission device as claimed in claim 1, wherein the transmission member is provided with lightening means.

28. The mechanical transmission device as claimed in claim 1, wherein the rolling guide device comprises a synchronized roller and a second small-sized rack device secured to the engine block which collaborates with the first small-sized rack of the transmission member so as to guide the transmission member on the engine block and to synchronize the vertical movement of said roller with respect to the piston.

29. The mechanical transmission device as claimed in claim 28, wherein the roller has a cylindrical body comprising, at each end, pinions and a guide groove provided between the pinions.

30. The mechanical transmission device as claimed in claim 28, wherein the second small-sized rack device comprises a central body forming a runway track comprising, at its middle, a vertical rib which collaborates with a guide groove of the roller so as to provide lateral guidance therefor, and third small-sized racks which are fixed onto the vertical edges of said central body to collaborate with the pinions of the roller so as to synchronize the vertical movement of said roller with that of the piston.

* * * * *